United States Patent
Mader et al.

(10) Patent No.: US 9,496,779 B2
(45) Date of Patent: Nov. 15, 2016

(54) DRIVE DEVICE FOR ROTATIONAL AND LINEAR MOVEMENTS WITH DECOUPLED INERTIAS

(75) Inventors: Daniel Mader, Bad Neustadt a.d. Saale (DE); Holger Schunk, Lendershausen (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 526 days.

(21) Appl. No.: 13/697,305

(22) PCT Filed: Apr. 4, 2011

(86) PCT No.: PCT/EP2011/055198
§ 371 (c)(1),
(2), (4) Date: Jan. 3, 2013

(87) PCT Pub. No.: WO2011/141236
PCT Pub. Date: Nov. 17, 2011

(65) Prior Publication Data
US 2013/0147285 A1    Jun. 13, 2013

(30) Foreign Application Priority Data
May 11, 2010   (DE) .................. 10 2010 028 872

(51) Int. Cl.
*H02K 41/02* (2006.01)
*H02K 33/00* (2006.01)
(Continued)

(52) U.S. Cl.
CPC ............ *H02K 41/02* (2013.01); *H02K 16/00* (2013.01); *H02K 21/14* (2013.01); *H02K 41/03* (2013.01); *H02K 2201/18* (2013.01)

(58) Field of Classification Search
CPC ............................. H02K 7/10; H02K 41/02
USPC .................... 310/12.01, 12.14, 12.19, 20, 80
See application file for complete search history.

(56) References Cited

U.S. PATENT DOCUMENTS 6,081,051 A * 6/2000 Kitazawa et al. .............. 310/20
6,222,294 B1   4/2001 Palmero
(Continued)

FOREIGN PATENT DOCUMENTS

CN    101312814 A    11/2008
DE     2624644 A1    12/1977
(Continued)

OTHER PUBLICATIONS

Machine Translation JP2003169456 (2003).*
(Continued)

*Primary Examiner* — Jose Gonzalez Quinones
(74) *Attorney, Agent, or Firm* — Henry M. Feiereisen LLC

(57) ABSTRACT

A drive device includes a rotational drive device with a rotating stator and a rotating armature for displacing a shaft in a rotational movement and a linear drive device with a linear stator and a linear armature for displacing a shaft in a linear movement. The rotational drive device and the linear drive device are arranged axially one behind the other, with the rotating armature and the linear armature being connected to a respective shaft section. The shaft sections of the rotating armature and the linear armature are axially aligned and connected to each other in a rotationally fixed manner such that the shaft sections can move axially with respect to each other but they can only rotate together.

6 Claims, 2 Drawing Sheets

(51) Int. Cl.
*H02K 7/10* (2006.01)
*H02K 16/00* (2006.01)
H02K 21/14 (2006.01)
H02K 41/03 (2006.01)

(56) References Cited

U.S. PATENT DOCUMENTS

| | | |
|---|---|---|
| 6,483,221 B1 | 11/2002 | Pawellek et al. |
| 6,628,031 B2 | 9/2003 | Vollmer |
| 6,768,238 B2 | 7/2004 | Vollmer et al. |
| 6,812,612 B2 | 11/2004 | Schunk et al. |
| 6,858,965 B2 | 2/2005 | Mueller et al. |
| 6,875,945 B2 | 4/2005 | Schunk et al. |
| 6,885,187 B2 | 4/2005 | Duenisch et al. |
| 6,943,467 B2 | 9/2005 | Potoradi et al. |
| 7,112,902 B2 | 9/2006 | Schunk et al. |
| 7,141,905 B2 | 11/2006 | Vollmer |
| 7,229,205 B2 | 6/2007 | Schunk et al. |
| 7,285,883 B2 | 10/2007 | Bott et al. |
| 7,352,099 B2 | 4/2008 | Schunk et al. |
| 7,442,022 B2 | 10/2008 | Konno |
| 7,501,728 B2 | 3/2009 | Schunk et al. |
| 7,564,158 B2 | 7/2009 | Huth et al. |
| 7,646,131 B2 | 1/2010 | Schunk et al. |
| 7,705,507 B2 | 4/2010 | Vollmer |
| 7,709,984 B2 | 5/2010 | Braun et al. |
| 7,732,967 B2 | 6/2010 | Vollmer et al. |
| 7,755,315 B2 | 7/2010 | Vollmer et al. |
| 7,777,373 B2 | 8/2010 | Bott et al. |
| 7,859,160 B2 | 12/2010 | Vollmer |
| 7,901,127 B2 | 3/2011 | Schunk et al. |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 2001/0043016 A1 | 11/2001 | Chun |
| 2004/0261553 A1* | 12/2004 | Bott et al. .......................... 74/25 |
| 2006/0153946 A1* | 7/2006 | Schmidt ............. B29C 45/5008 425/582 |
| 2006/0219880 A1 | 10/2006 | Braun et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0169718 A1 | 7/2008 | Schunk et al. |
| 2008/0185931 A1 | 8/2008 | Platen et al. |
| 2008/0284256 A1 | 11/2008 | Budde |
| 2008/0289440 A1 | 11/2008 | Vollmer et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0152959 A1 | 6/2009 | Vollmer |
| 2009/0152976 A1 | 6/2009 | Bott et al. |
| 2009/0160283 A1 | 6/2009 | Vollmer et al. |
| 2009/0251013 A1 | 10/2009 | Vollmer et al. |
| 2009/0302832 A1 | 12/2009 | Inalkac |
| 2009/0315424 A1 | 12/2009 | Vollmer |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0133940 A1 | 6/2010 | Grossmann et al. |
| 2010/0264770 A1 | 10/2010 | Braun et al. |
| 2011/0006617 A1 | 1/2011 | Budde et al. |
| 2012/0025654 A1 | 2/2012 | Bach et al. |
| 2012/0038228 A1 | 2/2012 | Vollmer |

FOREIGN PATENT DOCUMENTS

| | | | |
|---|---|---|---|
| DE | 20219091 U1 | 2/2003 | |
| DE | 10324601 | 12/2004 | |
| DE | 102007020274 A1 | 11/2008 | |
| DE | 102007021322 A1 | 11/2008 | |
| DE | 102007047715 A1 * | 4/2009 | ............ H02K 1/278 |
| EP | 0875982 A1 | 11/1998 | |
| EP | 0997226 B1 | 12/2005 | |
| JP | 08237931 A * | 9/1996 | |
| JP | 2003169456 A * | 6/2003 | |
| JP | 2006311715 A * | 11/2006 | |
| WO | WO 2009109935 A2 | 9/2009 | |

OTHER PUBLICATIONS

DE 103 24 601 A1 corresponds to U.S. Pat. No. 7,285,883, which is enclosed for translation purposes only.
EP 0 997 226 A2 corresponds to U.S. Pat. No. 5,997,223, which is enclosed for translation purposes only.

* cited by examiner

DRIVE DEVICE FOR ROTATIONAL AND LINEAR MOVEMENTS WITH DECOUPLED INERTIAS

CROSS-REFERENCES TO RELATED APPLICATIONS

This application is the U.S. National Stage of International Application No. PCT/EP2011/055198, filed Apr. 4, 2011, which designated the United States and has been published as International Publication No. WO 2011/141236 and which claims the priority of German Patent Application, Serial No. 10 2010 028 872.1, filed May 11, 2010, pursuant to 35 U.S.C. 119(a)-(d).

BACKGROUND OF THE INVENTION

The invention relates to a drive device comprising a rotational drive device and a linear drive device.

Combination drives of this type are known for instance from DE 103 24 601 A1.

Similarly, a plastic injection molding machine is known from the document U.S. Pat. No. 7,442,022 B2. in which the rotational drive and linear drive are embodied so as to interlace and/or overlap.

An arrangement having a rotational and a linear drive is known from document U.S. Pat. No. 6,222,294 B1. the armatures of which are decoupled from one another by means of a spring.

US 2001/0043016 discloses drives arranged one behind the other. The disadvantage here is that a comparatively large inertia of the drive as a whole is produced by linear and/or rotational movements by the acceleration of all moving masses.

EP 0 875 982 A1 discloses an electromagnetic linear drive, which comprises a hollow cylindrical stator and a stator follower which can be displaced in the interior of the stator in the direction of the longitudinal axis of the stator. A rigid connection of the shaft also exists here between the rotational section and the linear section, so that the reaction parts, e.g. windings or permanent magnets, must be embodied on the shaft as a whole over an axially longer section, in particular in the rotational section.

SUMMARY OF THE INVENTION

The object underlying the invention is to create a drive device, which can implement both rotational and also linear movements, wherein each of these movements is to take place on its own and also together in a highly dynamic manner.

The solution of the set object is achieved by a drive device having
- a rotational drive device with a rotating stator and a rotating armature for imparting a rotational movement to a shaft, and
- a linear drive device with a linear stator and a linear armature for imparting a linear movement to a shaft,
- rotational drive device and linear drive device arranged axially one behind the other,
- the rotating armature and the linear armature each connected to a respective shaft section,
- the shaft sections of the rotating armature and the linear armature axially aligned,
- the axially aligned shaft sections of the rotating armature and linear armature connected to each other by suitable means such that the shaft sections can move axially with respect to each other but they can only rotate together.

Combining two dynamoelectric machines, in which one is provided for a rotational movement, in other words a rotation and the other for the axial movement, in other words a linear movement, which act in each instance on their shaft section and thus effect a rotational and/or linear movement of a shaft, which drives a working machine. A drive apparatus for rotating and/or linear movements of a shaft, in other words a combination drive, is therefore created.

Furthermore, each shaft section is allocated its own dedicated bearing arrangement in accordance with the invention, in other words has its own independent bearings and is thus decoupled from the inertias of the respective other drive. The linear drive device only moves the mass of the linear armature and the linear shaft section. The rotational drive device moves the mass of the rotational armature and the masses of the linear shaft section and rotational shaft section.

The shaft of the drive device, which is composed of these shaft sections, drives a working machine, the masses of which must similarly be accelerated and/or braked. On account of the reduced inertias of the inventive drive device, in accordance with the invention these processes now take place in a highly dynamic manner.

The rotational drive device is preferably a permanently-excited synchronous machine. A cylindrical linear motor is provided with permanent magnets as a drive for the linear movement.

In order to further reduce the inertia, the shaft sections of the two drives are embodied to be hollow in a further embodiment.

The bearing arrangements are now adjusted to the inventive structure, i.e. the rotational shaft sections is only supported by means of radial bearings and the linear shaft section by axial bearings.

The rotation of the rotational shaft section is transmitted to the linear shaft section by means of suitable means. The two shaft sections are mechanically coupled here by a torque linear bearing or a splined shaft connection. This coupling ensures a transmission of the rotation of the rotational shaft section to the linear shaft section. The linear shaft section moves axially, wherein the shaft thus now produces a rotation and/or axial movement by mechanical coupling to a working machine. Depending on requirements of the working machine and/or specifications concerning control or regulation, the shaft therefore transmits a torque and/or an axial movement to the working machine.

The two shaft sections, in other words the rotational shaft section and the linear shaft section, are therefore decoupled from one another, so that torques are only transmitted by way of a suitable connection between the two shaft sections. Furthermore, the linear armature is also decoupled from its linear shaft section such that only axial movements of the linear armature can be transmitted to the linear shaft section. The rotation transmitted by the rotational shaft section to the linear shaft section, ultimately to the working machine, is not transmitted to the linear armature.

Therefore only the absolutely necessary masses which are required for a working process, e.g. injection molding of plastic, are now still accelerated. The inertias of the individual drives are decoupled from one another as far as is necessary, as a result of which higher accelerations of the overall system are possible in the rotational and/or linear direction.

This is particularly advantageous for production machines, in which high accelerations occur, e.g. in winding devices in the field of electric machines, in machine tools or also in textile machines.

BRIEF DESCRIPTION OF THE DRAWING

The invention and further advantageous embodiments of the invention are described in more detail below with the aid of schematically illustrated exemplary embodiments, in which.

DETAILED DESCRIPTION OF PREFERRED EMBODIMENTS

Figure 1:
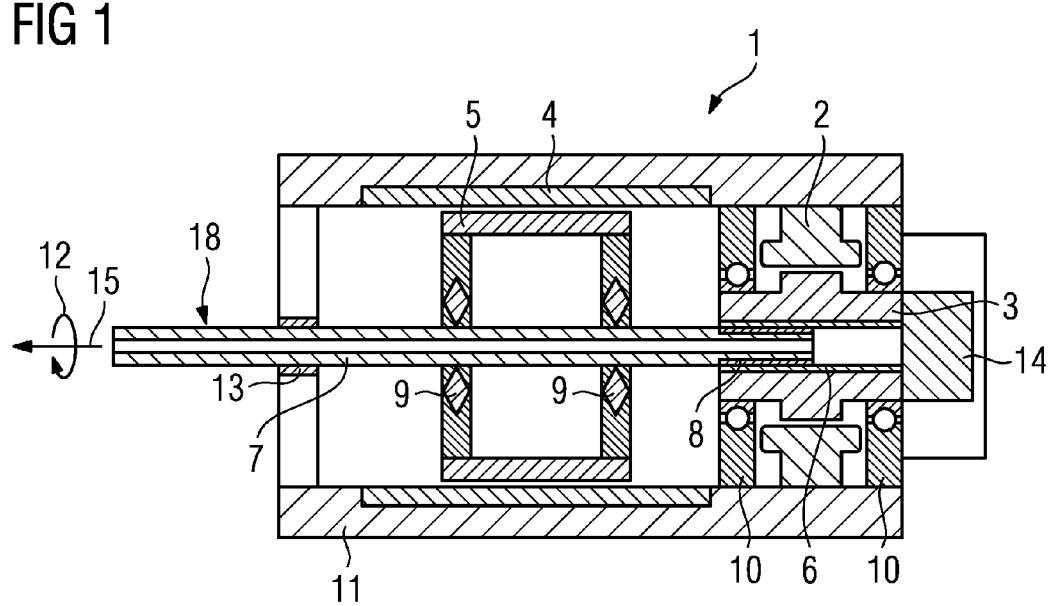
FIGS. 1 and 2 show different embodiments of an inventive drive device

FIG. 1 shows in a housing 11, a shaft 18 embodied as a hollow shaft and advantageously protruding herefrom. At the exit of the shaft 18 from the housing 11 a linear bearing 13 is provided. This shaft 18 is composed of a linear shaft section 7 and a rotational shaft section 6. These shaft sections are thus axially aligned. The linear shaft section 7 is connected to a linear armature 5 by way of an axial bearing 9, so that the linear armature 5 can transmit axial movements to the linear shaft section 7. Axial movements of the linear shaft section 7 can also be transmitted to the linear armature 5.

Rotational movements 12 are not transmitted from the linear shaft section 7 to the linear armature 5 or from the linear armature 5 to the linear shaft section 7 by means of the axial bearing 9. The linear armature 5 is moved axially by electromagnetic interaction with a linear stator 4. The linear stator 4 is preferably embodied as a solenoid motor. A linear movement 15 of the shaft section 7 and thus of the shaft 18 is thus produced.

The linear stator 4 need not necessarily be embodied as a solenoid motor. On account of the movement of the linear armature 5 which is only to be implemented axially, the linear drive arrangement can be embodied as a polygon motor. Here for instance linear motors are arranged in the peripheral direction in a polygon, in other words a triangle, square or hexagon about the linear shaft section 7. Each side is taken up by a linear stator 4. Correspondingly for this purpose the linear armature 5 is adjusted in terms of its cross-section to its linear stator 4.

With a triangular polygon motor, three linear motors are for instance constructively involved, which are arranged on the three sides of the polygon. Each side, in other words each linear motor comprises a linear stator and a linear armature. These linear armatures work together on the linear shaft section thereby forming a shared linear armature. This shared linear armature is supported in the way described and shown in the exemplary embodiments in FIG. 1 and FIG. 2.

In this exemplary embodiment according to FIG. 1, a rotational drive is arranged axially behind the linear drive, in other words on the side facing away from a driven working machine, said rotational drive comprising a rotating stator 2 and a rotating armature 3. The electromagnetic interaction between the rotating stator 2 and the rotating armature 3 imparts a rotational movement 12 to the rotating shaft section 6 and thus to the shaft 18. The rotating shaft section 6 and rotating armature 3 are connected to one another in a torque proof manner.

The rotating armature 3 is supported on the housing 11 by means of radial bearings 10. In order not to now have to move all masses of the entire drive device 1 in highly dynamic movement processes, the two shaft sections, in other words the rotating shaft section 6 and the linear shaft section 7 are mechanically coupled to one another by way of a torque linear bearing 8, which can also be embodied as a splined shaft connection. The rotational movement 12 of the rotating shaft section 6 is therefore transmitted via the torque linear bearing 8 to the linear shaft section 7. The linear shaft section 7 is axially moved by the linear drive device so that the shaft 18 itself, at the shaft end, e.g. upon transition to a working machine, can be axially or rotationally moved.

A hollow shaft sensor 14 coupled axially to the rotational drive device triggers the highly dynamic rotational movement for existing control and regulation processes.

Figure 2:
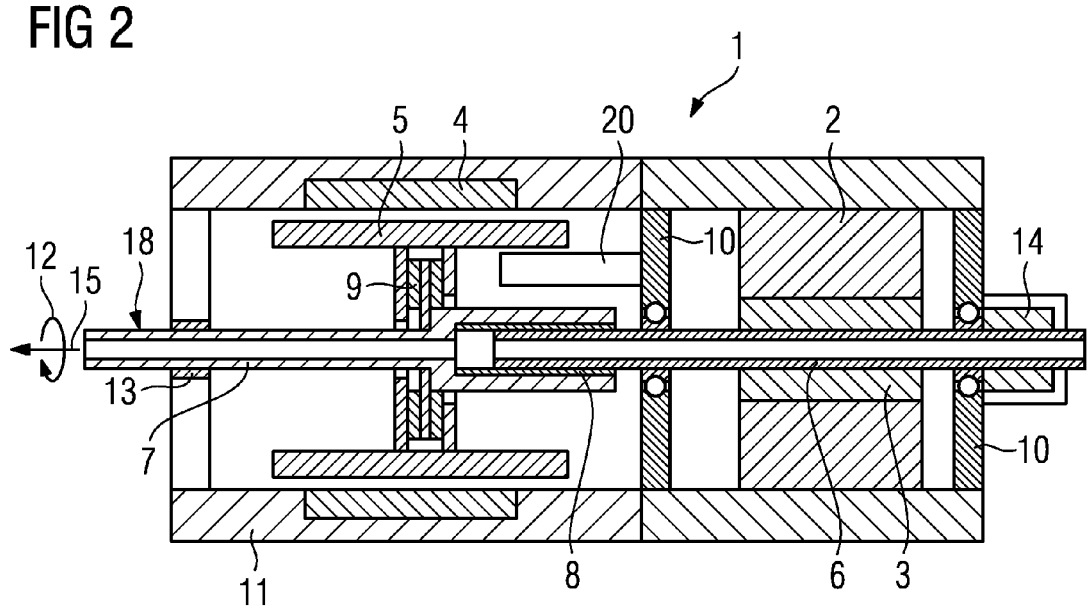

FIG. 2 shows in a further embodiment an inventive drive device 1, in which the bearing arrangement of the linear armature 5 is embodied as a disk-shaped axial bearing. A decoupling of the linear shaft section 7 and of the rotating shaft section 6 therefore exists, as described in FIG. 1. The decoupling therefore takes place by means of a torque linear bearing.

The inventive concept of decoupling as far as possible the inertias of the drives involved, rotational drive and linear drive, and thus a drive arrangement for highly dynamic processes, also forms the basis of this embodiment.

The most obvious difference here from the embodiment in FIG. 1 is the different axial extent of the linear stator 4 and the linear armature 5. In order to obtain a predetermined axial stroke with full drive output, either the linear stator 4 or the linear armature 5 is namely to be adjusted to the axial stroke required for the working machine.

The entire axial range of the linear armature 5 is either electromagnetically interactive with a predeterminable axial section of the linear stator 4, in accordance with FIG. 1, or the entire axial range of the linear stator 4 is electromagnetically interactive with a predeterminable axial section of the linear armature 5, as shown in FIG. 2. The necessary overlappings are predetermined here by the necessary stroke, which the working machine ultimately specifies, in other words the axial movement of the shaft 18.

Considerations of this type for the rotational drive are not required due to decoupling of the shaft sections, therefore a standard drive can inter alia be provided for the rotational drive.

The type of bearing of the linear armature 5 according to FIG. 1 can by all means be combined with the type of overlap between the linear armature 5 and linear stator 4 according to FIG. 2 and vice versa.

In order to reduce the axial extension of the drive device 1, the two drives are also to be structured so as to interlace, i.e. the rotational drive is located axially at least partially within the linear stator.

Figure 3:
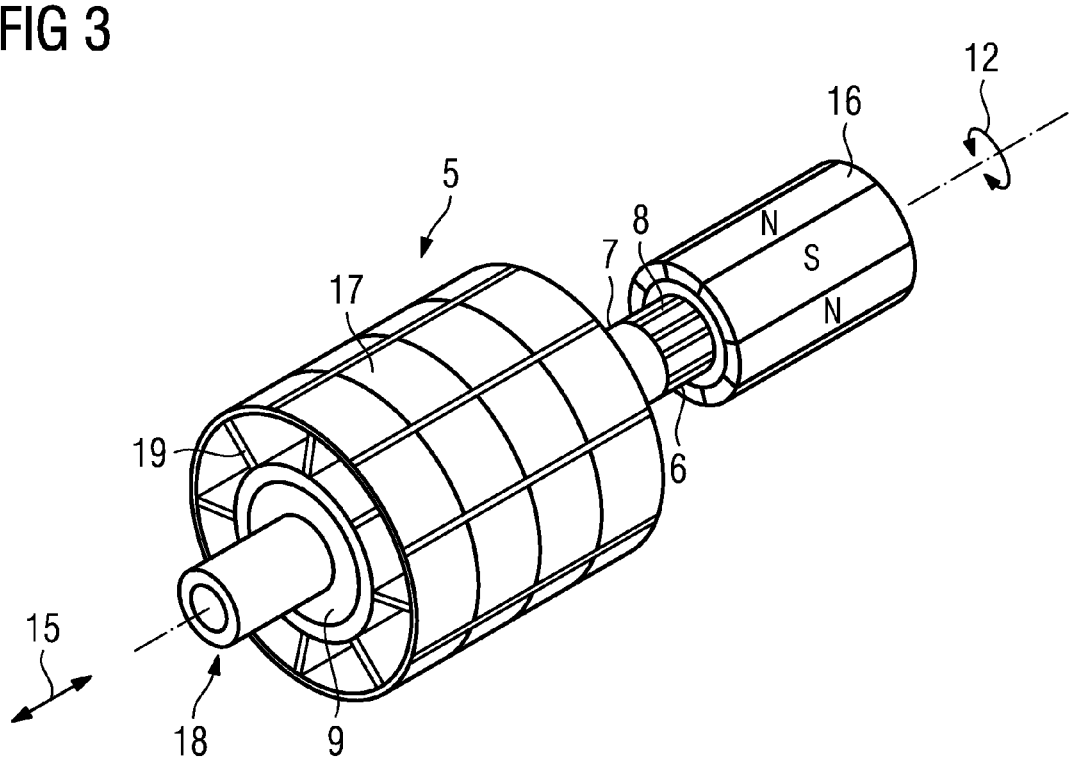
FIG. 3 shows a shaft of a drive device of this type.

FIG. 3 shows the shaft 18, with rotating shaft section 6 and the linear shaft section 7 and the permanent magnets 16, 17 arranged thereupon and shown in principle. Permanent magnets 16 of the rotational drive are provided on the rotating armature 3 and permanent magnets 17 of the linear drive are provided on the linear armature 5. The permanent magnets 16 are aligned axially. Viewed in the peripheral direction, north and south poles are arranged on the rotating armature 3 alternately. The permanent magnets 17 of the linear drive are arranged on the linear armature 5 as annular magnets or as segmented permanent magnets with a predetermined curvature. A change from north and south poles thus occurs when viewed in the axial direction.

Here the permanent magnets 16, 17 are preferably arranged by means of stepping or canting in order to prevent parasitic effects, such as detent torque. This could manifest itself in the item being manufactured by the working machine as low quality, for instance by means of grooves on a milled workpiece.

In the present exemplary embodiment, the shaft 18 is embodied as a solid shaft, this shaft 18 is ideally embodied as a hollow shaft, in order to further reduce the inertia of the overall system in order to benefit the dynamics. Here the linear shaft section 7 and/or the rotating shaft section 6 are embodied to be hollow at least in sections.

In order to further reduce the inertia of the overall system, the linear armature 5, as shown by way of example for instance in FIG. 3, having an axial bearing 9 close to the shaft, a bearing bracket 19 and permanent magnets 17 arranged on its periphery, is embodied with magnetic return means (not shown).

The drive device 1 is advantageously embodied from standard components. Both the rotational drive and also the linear drive are standard components, similar to the bearing used. This is inferred in particular from FIG. 2, in which the two housings of the drives are combined. Only one adjustment of the mechanical coupling between the linear shaft drive 7 and the rotating shaft section 6 is ultimately necessary.

Sensors 20 for the linear movement 15 according to FIG. 2 and/or hollow shaft sensor 14 are detection means for a control and regulation facility (not shown) of the highly dynamic movement process.

The invention claimed is:

1. A drive device, comprising:
a shaft;
a rotational drive device having a rotating stator and a rotating armature for imparting a rotational movement to the shaft, said rotating armature being connected to a first shaft section;
a linear drive device having a linear stator and a linear armature for imparting a linear movement to the shaft, the rotational drive device and the linear drive device being arranged coaxially one behind the other, said linear armature being connected to a second shaft section in axial alignment with the first shaft section, with the first and second shaft sections being connected to each other so as to be movable axially with respect to each other but rotatable only together; and
a detector, operably connected to a control and regulation facility, for ascertaining a highly dynamic movement of the shaft, said detector being at least one member selected from the group consisting of a sensor for detecting the linear movement of the shaft, and a hollow shaft sensor for detecting the rotational movement of the shaft,
wherein said first shaft section and said second shaft section having axially proximal end portions which are arranged telescopically in one another and axially distal end portions which are axially spaced from each other and connected to the rotating armature and to the linear armature respectively,
wherein said axially proximal end portions of said first shaft section and said second shaft section are arranged telescopically in one another with interposition of a torque linear bearing and radially inside said rotating armature of said rotational drive device.

2. The drive device of claim 1, wherein the first and second shaft sections are connected to each other via a torque-proof connection in the form of a splined shaft connection or torque linear bearing.

3. The drive device of claim 1, wherein at least one of the linear armature and the linear stator has an axial extent in correspondence to a movement stroke of the drive device.

4. The drive device of claim 1, wherein the rotating armature is connected to the first shaft section in a torque-proof manner.

5. The drive device of claim 1, further comprising an axial bearing for support of the linear armature.

6. The drive device of claim 1, for use in a winding device for a coil of an electric machine or a plastic injection molding machine.

* * * * *